(12) United States Patent
Berclaz et al.

(10) Patent No.: US 10,495,760 B2
(45) Date of Patent: Dec. 3, 2019

(54) LOCATION ACCURACY DETERMINATION BASED ON DATA FROM SECOND SENSOR

(71) Applicant: Uber Technologies, Inc., San Francisco, CA (US)

(72) Inventors: Jerome Berclaz, Sunnyvale, CA (US); Vasudev Parameswaran, Fremont, CA (US)

(73) Assignee: Uber Technologies, Inc., San Francisco, CA (US)

( * ) Notice: Subject to any disclaimer, the term of this patent is extended or adjusted under 35 U.S.C. 154(b) by 334 days.

(21) Appl. No.: 15/477,021

(22) Filed: Apr. 1, 2017

(65) Prior Publication Data

US 2018/0156923 A1 Jun. 7, 2018

Related U.S. Application Data

(60) Provisional application No. 62/429,677, filed on Dec. 2, 2016.

(51) Int. Cl.

| G01S 19/26 | (2010.01) |
|---|---|
| G01S 19/47 | (2010.01) |
| G01S 19/25 | (2010.01) |
| G01S 19/31 | (2010.01) |
| G01S 19/39 | (2010.01) |
| G01S 19/49 | (2010.01) |

(52) U.S. Cl.
CPC ............ *G01S 19/26* (2013.01); *G01S 19/252* (2013.01); *G01S 19/254* (2013.01); *G01S 19/256* (2013.01); *G01S 19/31* (2013.01); *G01S 19/39* (2013.01); *G01S 19/47* (2013.01); *G01S 19/49* (2013.01)

(58) Field of Classification Search
CPC ...... G01S 19/26; G01S 19/252; G01S 19/254; G01S 19/256; G01S 19/31; G01S 19/39; G01S 19/47
USPC ..................................................... 342/357.65
See application file for complete search history.

(56) References Cited

U.S. PATENT DOCUMENTS

| 8,831,633 | B2 | 9/2014 | Moshfeghi | |
|---|---|---|---|---|
| 9,273,968 | B2 * | 3/2016 | Oohashi | ................. G01C 21/30 |
| 9,562,774 | B2 * | 2/2017 | Shimada | ............ G01C 21/3655 |
| 9,650,039 | B2 * | 5/2017 | Hocking | ................ B60W 30/02 |
| 2002/0158796 | A1 * | 10/2002 | Humphrey | ............ G01C 21/165 |
| | | | | 342/357.31 |
| 2013/0018581 | A1 * | 1/2013 | Sidhu | ..................... G01C 21/16 |
| | | | | 701/469 |
| 2015/0148075 | A1 | 5/2015 | Alshihi | |

* cited by examiner

*Primary Examiner* — Harry K Liu
(74) *Attorney, Agent, or Firm* — Fenwick & West LLP

(57) ABSTRACT

A location detection system performs a process that uses data from a satellite navigation sensor in conjunction with data from a second sensor to determine the accuracy of location estimates provided by the satellite navigation sensor. The system uses the satellite navigation sensor to determine location estimates from at a first time and a second time. The system also uses data from the second sensor to determine a third location estimate, which represents another estimate of the system's location at the second time. The system uses the three location estimates to determine whether the second location estimate satisfies an accuracy condition. If the accuracy condition is satisfied, then the second location estimate may be provided as input to a process.

20 Claims, 7 Drawing Sheets

LOCATION ACCURACY DETERMINATION BASED ON DATA FROM SECOND SENSOR

CROSS-REFERENCE TO RELATED APPLICATION

This application claims the benefit of U.S. Provisional Application No. 62/429,677, filed Dec. 2, 2016, which is hereby incorporated by reference in its entirety.

TECHNICAL FIELD

This disclosure relates generally to location accuracy and more particularly to using data from a second sensor to determine the accuracy of a location reported by a satellite navigation system.

BACKGROUND

Many network services, such as service coordination systems, use the locations of their users to carry out various location-based functions. A user's location is typically provided by a satellite navigation sensor, such as a GPS receiver, on a mobile device associated with the user. Satellite navigation sensors also provide an accuracy measure for the provided location. However, the accuracy measures of many satellite navigation sensors tend to be overconfident; in other words, they tend to report an error value that is smaller than the actual error value of the location being provided. As a result, any process that relies on the accuracy measure reported by a satellite navigation system may be subject to reduced effectiveness.

SUMMARY

A location detection system uses data from a satellite navigation sensor in conjunction with data from a second sensor to determine whether a location estimate provided by the satellite navigation sensor satisfies an accuracy condition. The system determines, using a satellite navigation sensor, a first location estimate at a first time and a second location estimate at a second time. The system determines whether the second location estimate satisfies an accuracy condition based at least on the first location estimate, the second location estimate, and a third location estimate that the system determines using data collected by a second sensor. If the system determines that the second location estimate satisfies the accuracy condition, the system may provide the second estimate as input to a process.

Figure 1:
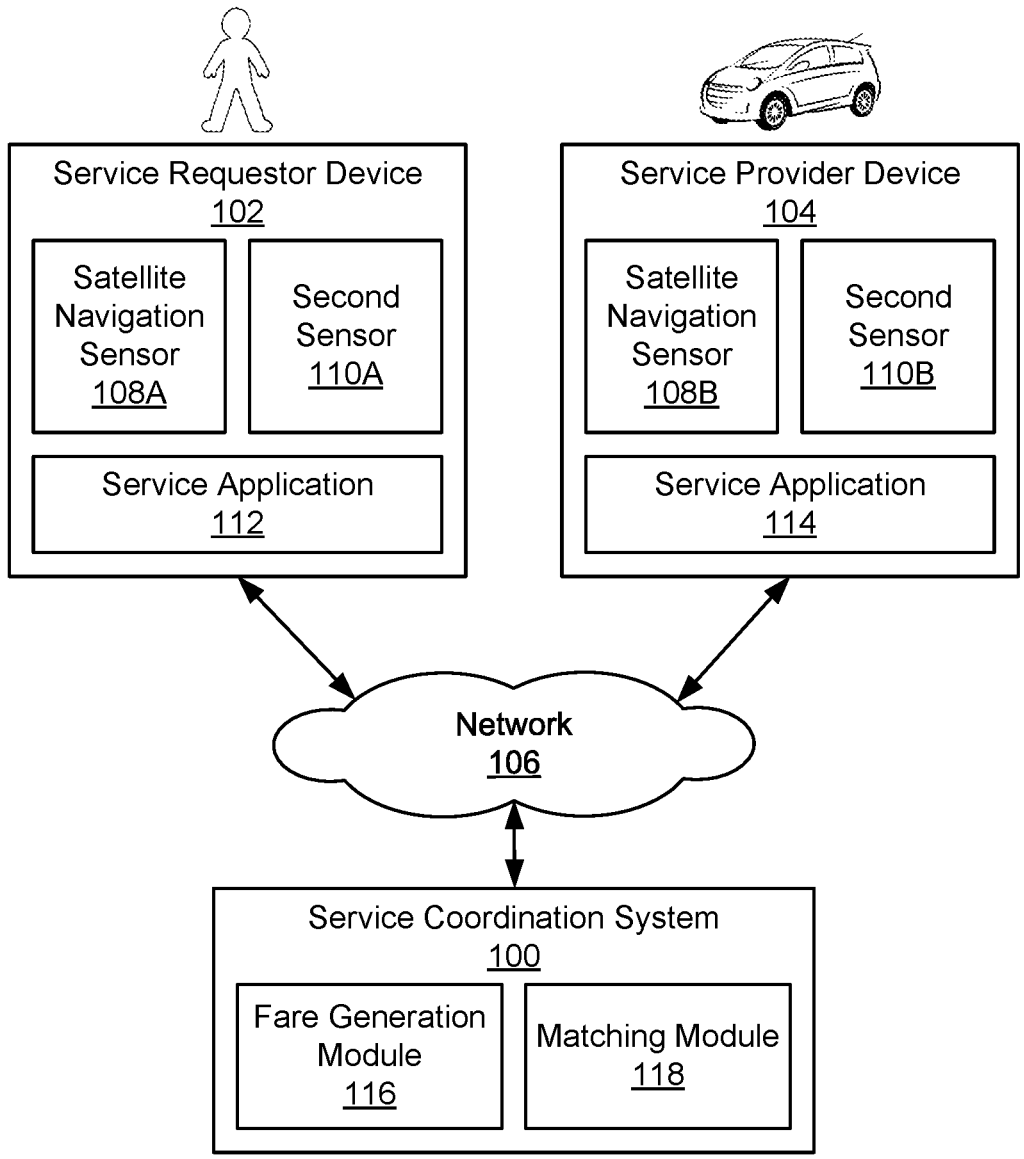
FIG. 1 illustrates a system architecture of a service coordination system, according to one embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Modern satellite navigation sensors, such as GPS receivers, operate by receiving signals from multiple navigation satellites and using the signals to determine an estimate of the current location of the satellite navigation sensor. In many cases, a satellite navigation sensor also determines an error measure (e.g., a confidence level) for the location estimate. For example, a GPS receiver may provide a location estimate specifying the receiver's current latitude and longitude coordinates along with an error measure specifying with 95% confidence that the receiver's current true position is within 5 meters of the location estimate.

The error measure for the location estimate provided by a satellite navigation sensor can be used in a variety of different ways. For example, a service coordination system that arranges a transport service or a delivery service between a service requestor and a service provider may use the locations of service requestors and service providers to perform various functions, such as matching service providers to service requestors, and the service coordination system may use the error measure for a location estimate to determine whether the location estimate is sufficiently reliable to be used for a particular function.

One shortcoming of the error measures that are provided by a satellite navigation sensor is that, under some circumstances, these error measures tend to underestimate the error for a location estimate. In particular, a satellite navigation sensor is especially likely to understate the error in a location estimate when the sensor is operating in a city because the signals used to determine the location estimate are subject to higher levels of interference and distortion due to the surrounding buildings and the prevalence of other electromagnetic signals in the area.

Instead of relying on the error measure provided by a satellite navigation sensor, according to the described embodiments, a location detection system (e.g., a mobile device inside a transportation vehicle operated by a service provider) performs a process that uses data from the satellite navigation sensor in conjunction with data from a second sensor to determine the accuracy of location estimates provided by the satellite navigation sensor. The location detection system uses the satellite navigation sensor to determine location estimates at a first time and a second time (e.g., by recording the latitude and longitude coordinates provided by a GPS receiver at the first time and the second time). The first and second times may correspond to the times at which two consecutive data samples are recorded by the location detection system.

The location detection system uses data from a second sensor to determine a third location estimate, which is another estimate of the system's location at the second time. In one embodiment, the second sensor is an inertial measurement unit (IMU) that includes sensors for measuring the acceleration and orientation of the location detection system.

In this embodiment, the location detection system collects data from the IMU between the first and second times (e.g., between the two consecutive data samples recorded from the satellite navigation sensor) and performs a dead reckoning process on the IMU data to determine the third location estimate. The dead reckoning process is a second-order numerical integration process that receives input data representing the acceleration and initial velocity of the location detection system over a time interval (e.g., the interval between the first and second times) and computes the system's change in position during the time interval.

The location detection system uses the three location estimates to determine whether the second location estimate (e.g., the estimate provided by the satellite navigation sensor at the second time) satisfies an accuracy condition. In one embodiment, the location detection system generates two travel measurements. A first travel measurement quantifies the distance between the first and second location measurements and represents the distance traveled between the first and second times according to the satellite navigation sensor. A second travel measurement quantifies the distance between the first and third location measurements and represents the distance traveled between the first and second times according to the second sensor. In various embodiments, the first and second gravel measurements may be vector quantities or scalar quantities.

The location detection system computes an error metric by comparing the two travel measurements. The error metric represents the discrepancy between the first and second travel measurements. Thus, if the error metric has a relatively small value, then the first and second measurements are relatively similar, which indicates that the satellite navigation sensor and the second sensor are providing similar data about the distance traveled between the first and second times. As a result, a relatively small error metric indicates that the satellite navigation system is providing relatively accurate data. If the error metric is lower than an error threshold, then the location detection system determines that the second location estimate satisfies the accuracy condition.

If the second location estimate satisfies the accuracy condition, the location detection system provides the second location estimate as input to a process. For example, if the location detection system is a mobile device inside a transportation vehicle operated by a service provider, then the second location estimate may be provided to a service coordinate system as input to a process that matches the service provider to trip requests. If the second location estimate does not satisfy the accuracy condition, then the location detection system can withhold the second location estimate from the process and/or provide the third location estimate to the process as a substitute for the second location estimate.

FIG. 1 illustrates a system environment for a service coordination system 100, according to one embodiment. In particular, FIG. 1 illustrates a detailed view of modules within a service coordination system 100, a service requestor device 102, and a service provider device 104 according to one embodiment. Some embodiments of the service coordination system 100, the service requestor device 102, and the service provider device 104 have different modules than those described here. Similarly, the functions can be distributed among the modules in a different manner than is described here. As used herein, the term "module" refers to computer program logic used to provide the specified functionality. Thus, a module can be implemented in hardware, firmware, and/or software.

In one embodiment, the service coordination system 100 implements a network service, such as an arrangement service, which enables services to be arranged between parties such as between the users of the service requestor device 102 and the service provider device 104. As described herein, a service provider device 104 can correspond to a mobile computing device, such as a smartphone, that is operated by a service provider, such as a driver of a vehicle, or can correspond to an on-board computing system of a vehicle. The service coordination system 100 can correspond to a set of servers, in some examples, and can operate with or as part of another system that implements network services. An example of the services includes arranging a transport service or a delivery service between a service requestor and a service provider. In the context of the discussion herein, an operator of a transportation vehicle (e.g., the service provider) provides the service of transporting a person (e.g., the service requestor) to a destination requested by the person. In one embodiment, transportation vehicles include vehicles, such as cars and motorcycles, as well as public transportation vehicles such as trains, light rail, buses, etc.

In one embodiment, the transportation of a person from a starting location to a destination location is referred to as a trip. The service coordination system 100 includes a fare generation module 116 that calculates fares for trips. A fare is a monetary payment from a service requestor to a service provider in exchange for the service provider transporting the service requestor to a destination location. The fare generation module 116 may calculate the fare for a trip based on the distance travelled during the trip (and/or based on a duration of the trip, any applicable tolls, fees, etc.). The fare generation module 116 determines the distance travelled during the trip using geographic information received from the service provider device 104 (e.g., such as after completion of the trip).

The service coordination system 100 receives (e.g., periodically) geographic information from a service provider device 104 included in a transportation vehicle as the transportation vehicle moves its position. The geographic information includes geographic points that describe a trip of the transportation vehicle. In one embodiment, the geographic information is a location estimate provided by the method described in FIG. 2A.

As shown in FIG. 1, the service coordination system 100 is in communication with the service requestor device 102 and the service provider device 104 via a network(s) 106. In one embodiment, the network 106 is the Internet or any combination of a LAN, a MAN, a WAN, a mobile, wired or wireless network, a private network, or a virtual private network. While only a service requestor device 102 and a single service provider device 104 are shown in FIG. 1, any number of these devices 102,104 can be in communication with the service coordination system 100 at a given time.

In one embodiment, the service requestor device 102 is an electronic device (e.g., a smart phone) of a person that requested a trip. The service requestor device 102 is used by the person to request a trip from a starting location to a destination location via a service application 112 included in the service requestor device 102. The service application 112 allows the user of the service requestor device 102 to submit a trip request, which the service coordination system 100 then processes in order to select an operator of a transportation vehicle.

According to examples, the trip request may include (i) a user identifier (ID), (ii) a pick-up location (e.g., a location specified by the user or the current location of the service requestor device 102), (iii) a destination location, and/or (iv) a vehicle type. In one embodiment, the current position of the service requestor device 102 is represented by latitude and longitude coordinates as determined by the method described in FIG. 2A. The current position of the service requestor device 102 is also associated with a time stamp indicating the time and the date in which the satellite navigation sensor 108A measured the current position of the service requestor device 102. Alternatively, the pick-up location of the service requestor device 102 may be manually inputted into the service requestor device 102 by the user of the device 102, such as by selecting a location on a map or in the form of an address including at least a street number and street name.

The arrangement service, which is implemented by the service coordination system 100 and/or other servers or systems, can receive the trip request over the network 106 and can match a service provider to the trip request. In one example, matching module 118 of the service coordination system 100 performs a matching process in which the module 118 (i) identifies a pool of service providers that are available to provide the requested service and satisfy one or more conditions (e.g., have the specified vehicle type, and/or are within a predetermined distance or estimated travel time away from the pick-up location), (ii) selects a service provider from the pool of service providers, and (iii) transmits an invitation to the service provider device 104 of the service provider. The invitation can include the pick-up location, so that the selected service provider can navigate to the pick-up location for initiating the trip for the requestor. In one embodiment, the service provider device 104 is configured to automatically accept an invitation upon receipt. In another embodiment, the service provider device 104 provides the service provider an option to accept or decline the invitation by providing user input. If the invitation is accepted, either automatically or in response to user input, the service coordination system 100 can notify the service requestor device 102 accordingly. If the invitation is not accepted (e.g., in response to user input from the service provider), the arrangement service can select a second service provider from the pool of service providers and transmit a second invitation to the service provider device 104 of the second service provider.

In one embodiment, the service provider device 104 is an electronic device located within the transportation vehicle used to complete trips. For example, the service provider device 104 may be a smart phone in the transportation vehicle. As another example, the service provider device 104 may a computing system integrated into the transportation vehicle. The service provider device 104 includes a service application 114. The service application 114 displays, on the service provider device 104, information about a trip that the service provider has agreed to provide, such as the pick-up location, and/or navigation and/or mapping information instructing the service provider to travel to the pick-up location. As referred to herein, the pick-up location may be the current location of the service requestor device 102 or a location specified by the user of the service requestor device 102. The service application 114 may also display, on the service provider device 104, the destination for the assigned trip if provided by the user of the service application 114.

Each of the service applications 112 and 114 respectively stored at the service requestor device 102 and the service provider device 104 can include or use an application programming interface (API) to communicate data with the service coordination system 100. The API can provide access to the service coordination system 100 via secure access channels over the network 106 through any number of methods, such as web based forms, programmatic access via RESTful APIs, Simple Object Access Protocol (SOAP), remote procedure call (RPC), scripting access, etc., while also providing secure access methods including key-based access to ensure the service coordination system 100 remains secure and only authorized users, service providers, and/or third parties can gain access to the service coordination system 100

The service requestor device 102 and/or the service provider device 104 also include a satellite navigation sensor 108A, 108B (hereinafter referred to as the satellite navigation sensor 108) and a second sensor 110A, 110B (hereinafter referred to as the second sensor 110). The satellite navigation sensor 108 is a device that receives signals from a global navigation satellite system (GNSS), such as GPS (Global Positioning System), GLONASS, Galileo, or BeiDou, and uses the signals to determine an estimate of the device's location. For instance, the location estimate can be expressed as location coordinates, such as latitude and longitude coordinates. The location estimate generated by the satellite navigation sensor is representative of the position of the corresponding device 102, 104 at different instances in time. For example, at time T1, the device 102, 104 can be at a particular location, identified by location coordinates and a time stamp indicative of the time and date when the device 102, 104 measured its current position. If the device 102, 104 is moving, at time T2 the device 102, 104 can be at a different location. In this manner, the device 102, 104 periodically measures the current position of the transportation vehicle (e.g., every three seconds, every four seconds, etc.). Alternatively, the device 102, 104 may provide location data whenever new or updated measurements of the current location of the device 102, 104 are taken or are available.

The satellite navigation sensor 108 may also provide an error measure for the location estimate. In one embodiment, the error measure is a distance interval that has a 95% confidence interval. In other words, the error measure indicates with 95% certainty that the distance between the location indicated by the coordinates and the true location of the service provider device 104 (and thus the transportation vehicle) is less than the distance interval. For example, if the error measure includes a distance interval of 5 meters, then the error measure indicates with 95% certainty that the true location of the device 102, 104 is within 5 meters of the location indicated by the location coordinates. In other embodiments, the confidence interval has a different value (e.g., 99.7%, 68%).

The second sensor 110 comprises one or more sensors that provide data that can be used to generate a second estimate of the location of the device 102, 104. In one embodiment, the second sensor is an inertial measurement unit (IMU). In this embodiment, the IMU includes one or more sensors that detect translational and rotational motion of the service requestor device 102 or the service provider device. For example, the IMU 108 contains an accelerometer and a gyroscope. In another embodiment, the second sensor 110 is a different type of satellite navigation sensor (e.g., different from the satellite navigation sensor 108) or some other type of sensor(s) capable of generating data that can be used to generate a location estimate.

Although FIG. 1 indicates that the service requestor device 102 and the service provider device 104 both include a satellite navigation sensor 108 and a second sensor 110, in some embodiments one or both of these sensors 108, 110 can be omitted from one of these devices. For example, the service provider device 104 includes a satellite navigation sensor 108B and a second sensor 110B, but one or both of the sensors 108A, 110A are omitted from the service requestor device 102.

Similarly, although FIG. 1 indicates that the satellite navigation sensor 108 and the second sensor 110 are housed in the same device 102, 104, in other embodiments the two sensors 108, 110 are housed in two separate devices that are in communication with each other and move in conjunction with each other. For example, the satellite navigation sensor 108B may be part of a computing system integrated into a transportation vehicle being driven by the service provider while the second sensor 110B part of a mobile device inside the transportation vehicle and is communicatively coupled to the transportation vehicle's integrated computing system (e.g., the mobile device may be paired to the integrated computing system via a wireless communications protocol such as BLUETOOTH).

Figure 2A:
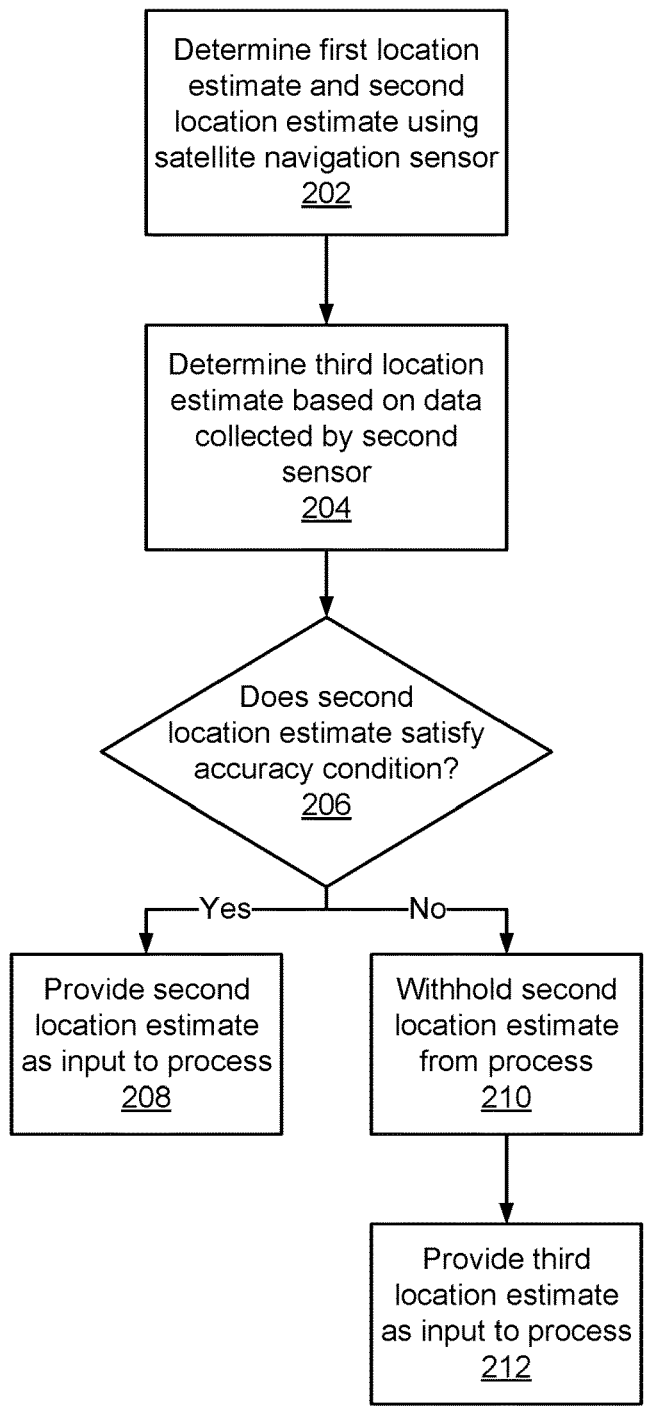
FIG. 2A is a flow chart illustrating a method for determining whether to provide a location estimate from a satellite navigation sensor as input to a process, according to one embodiment.
Figure 2B:
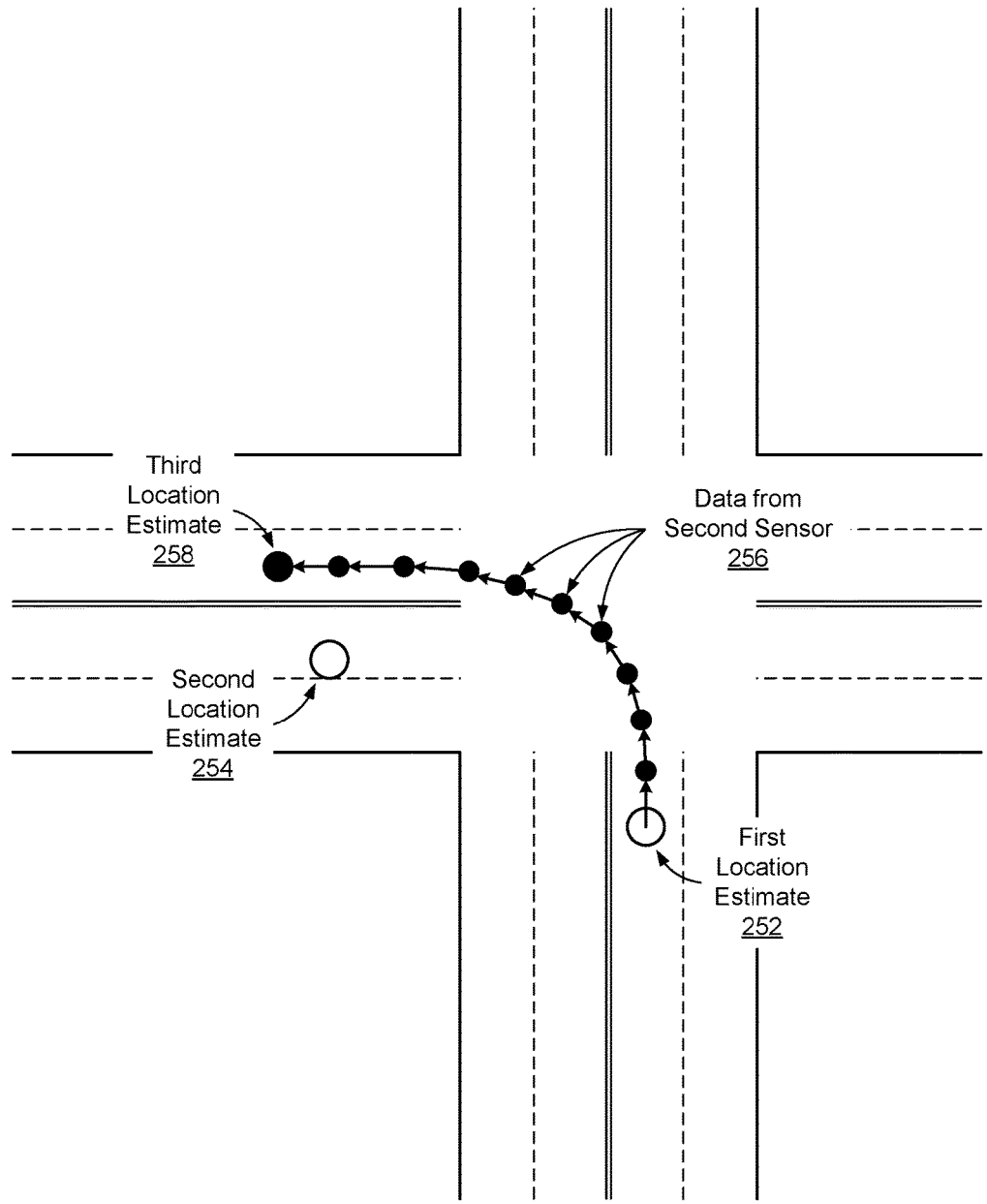
FIG. 2B illustrates an example of location estimates and second sensor data, according to one embodiment.

FIG. 2A is a flow chart illustrating a method for determining whether to provide a location estimate from a satellite navigation sensor as input to a process, according to one embodiment. FIG. 2B illustrates an example of location estimates and second sensor data, according to one embodiment. For ease of description, the method shown in FIG. 2A and the example in FIG. 2B are discussed together.

Figure 3A:
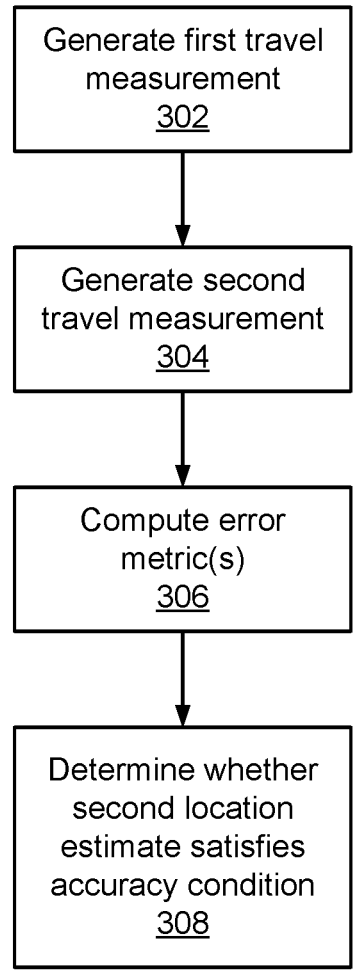
FIG. 3A is a flow chart illustrating a method for determining the accuracy of a location reported by a satellite navigation sensor based on data from a second sensor, according to one embodiment.

The methods shown in FIGS. 2A and 3A are discussed herein as taking place on the service provider device 104. However, these methods may take place on any device capable of operating as a location detection device (e.g., any device that includes a satellite navigation sensor 108 and a second sensor 110). For instance, the methods may take place on the service requestor device 102. In other embodiments, rather than taking place on a single device, these methods may take place on a location detection system comprising one or more devices in communication with each other. For example, the location detection system may include (1) a computing system integrated into a transportation vehicle and (2) a mobile device (e.g., a smartphone) inside the transportation vehicle and communicatively coupled to the integrated computing system, as described above.

The service provider device 104 uses the satellite navigation sensor 108B to determine 202 a first location estimate at a first time and a second location estimate at a second time. For example, the service provider device 104 records the location estimate (e.g., latitude and longitude coordinates) provided by the satellite navigation sensor 108B at the first time and the second time. In one embodiment, the service provider device 104 records location estimates provided by a satellite navigation sensor 108B at fixed intervals, such as every 2.0 seconds (e.g., a rate of 0.5 Hz). In this embodiment, two consecutive location estimates may be used as the first and second location estimates, in which case the first time and the second time are separated by 2.0 seconds.

The example in FIG. 2B illustrates first and second location estimates 252, 254 that are recorded two seconds apart by a satellite navigation sensor 108B as a transportation vehicle makes a left turn at an intersection. The first location estimate 252 is recorded shortly before the transportation vehicle has entered the intersection, and the second location estimate 254 is recorded two seconds later, after the transportation vehicle has completed the turn.

Referring back to FIG. 2A, the service provider device 104 also determines 204 a third location estimate based on data collected by the second sensor 110B between the first time and the second time. As described above with reference to FIG. 1, the second sensor 110B in various embodiments may be an inertial measurement unit (IMU), a different type of satellite navigation sensor, or some other sensor or collection of sensors capable of collecting data that can be used to determine a location estimate.

In embodiments where the second sensor 110B is an IMU, the third location estimate may be determined 204 by performing a dead reckoning process on the data collected by the IMU. Before performing the dead reckoning process, the service provider device 104 may perform a reference frame adjustment process on the IMU data to translate the IMU data to a new reference frame. For example, if the IMU is part of a mobile device in the transportation vehicle, the raw data provided by the IMU is provided with respect to the reference frame of the mobile device, and the reference frame adjust process may be performed to translate the IMU data into the reference frame of the vehicle. In one embodiment, the reference frame adjustment process includes two steps: first, the IMU data is rotated so that the gravity vector points downward; and second, the IMU data is rotated about the vertical axis so that the acceleration and orientation data provided by the IMU are aligned with forward direction of the new reference frame (e.g., the reference frame of the transportation vehicle).

The dead reckoning process determines the current position of the service provider device 104 by advancing the previous position of the service provider device based on acceleration and orientation data from the IMU. In one embodiment, the service provider device 104 collects multiple data samples from the IMU between the first time and the second time (e.g., the times at which the service provider device 104 records the location estimates provided by the satellite navigation sensor 108B), and the service provider device 104 performs the dead reckoning process iteratively on each data sample from the IMU. For instance, the service provider device 104 may collect data samples from the IMU at 5 Hz (e.g., every 0.2 seconds) while the device 104 collects data samples (e.g., location estimates) from the satellite navigation sensor 108B at 0.5 Hz (e.g., every 2.0 seconds).

In one embodiment, the location detection device performs an iteration of the dead reckoning process in two steps. First, the location detection device evaluates the following two equations to transform the acceleration data from the IMU (or the adjusted acceleration data generated by the reference frame adjustment process) into acceleration along the east-west and north-south axes:

$$a_j^e = a_j^x \cdot \sin(\theta_j) + a_j^y \cdot \cos(\theta_j)$$

$$a_j^n = a_j^x \cdot \cos(\theta_j) - a_j^y \cdot \sin(\theta_j)$$

In these equations, $a_j^e$ is the acceleration component along the east-west axis, $a_j^n$ is the acceleration component along the north-south axis, $a_j^x$ is acceleration in the x-axis in the reference frame of the transportation vehicle, $a_j^y$ is the acceleration in the y-axis in the reference frame of the transportation vehicle, and $\theta_j$ is the heading of the transportation vehicle. The subscript j is an index for the current iteration.

Second, the service provider device 104 determines its current location by evaluating the following five equations:

$$x_{j+1} = x_j + v_j^e \cdot \Delta t_j + \tfrac{1}{2} \cdot a_j^e \cdot \Delta t_j^2$$

$$y_{j+1} = y_j + v_j^n \cdot \Delta t_j + \tfrac{1}{2} \cdot a_j^n \cdot \Delta t_j^2$$

$$v_{j+1}^e = v_j^e + a_j^e \cdot \Delta t_j$$

$$v_{j+1}{}^n = v_j{}^n + a_j{}^n \cdot \Delta t_j$$

$$\theta_{j+1} = \theta_j + tr_j \cdot \Delta t_j$$

In these equations, x and y represent the position coordinates of the transportation vehicle relative to north-south and east-west axes, $v^n$ and $v^e$ represent the velocity components of the transportation vehicle relative to the north-south and east-west axes, respectively, and $\Delta t$ represents the sampling period of the IMU (e.g., 0.2 seconds). The subscript j+1 is an index for the next iteration.

For the first iteration, the velocity components of the transportation vehicle may be provided by the satellite navigation sensor 108B. In one embodiment, the position coordinates for the first iteration have values of $x_0=0$ and $y_0=0$, which means the position coordinates generated by each subsequent iteration of the dead reckoning process represents a position relative to the position at the beginning of the dead reckoning process. In another embodiment, the position coordinates for the first iteration are also provided by the satellite navigation sensor 108B, which means the position coordinates generated by each subsequent iteration of the dead reckoning process represent an absolute location (e.g., latitude and longitude coordinates). In subsequent iterations, the position coordinates and the velocity components from the preceding iteration are used.

Referring again to FIG. 2B, the service provider device 104 also collects data from the second sensor 256 as the transportation vehicle makes the left turn. In the example in FIG. 2B, the second sensor 108B is an IMU, and the service provider device 104 collects a data sample from the IMU every 0.2 seconds. As noted above, the first and second location estimates in this example are recorded 2.0 seconds apart, so the service provider device 104 collects ten IMU data samples between the times at which the service provider device 104 records the first and second location estimates. The black dots 256 represent the positions generated by performing the iterative dead reckoning process described above on the data collected from the IMU. The final black dot, which is the position generated by the final iteration of the dead reckoning process, is designated as the third location estimate 258.

Referring back to FIG. 2A, the service provider device 104 uses the first location estimate, the second location estimate, and the third location estimate to determine 206 whether the second location estimate satisfies an accuracy condition. The accuracy condition is selected so that the second location estimate represents a sufficiently accurate representation of the current location of the service provider device 104 if the accuracy condition is satisfied. An example process for determining 206 whether the second location estimate satisfies an accuracy condition is described below with reference to FIG. 3A.

If the second location estimate satisfies the accuracy condition, then the service provider device 104 provides 208 the second location estimate as input to a process. For example, if the method shown in FIG. 2A is performed while the service provider is in the process of providing a trip for a service requestor (e.g., transporting the service requestor from an origin location to a destination location), the service provider device 104 may provide 208 the second location estimate to the fare generation module 116. In this example, the method may be performed multiple times over the course of the trip so that multiple location estimates for the service are provided to fare generation module 116, and the fare generation module 116 can use the location estimates to determine the distance that the service provider traveled while completing the trip in order to generate a fare for the trip. As another example, if the method shown in FIG. 2A is performed before the service provider has been matched to a trip request, the service provider device 104 may provide the second location estimate to the matching module 118 so that the matching module 118 has an updated record of the service requestor's location and can more effectively match the service requestor to trip requests.

As noted above, the method shown in FIGS. 2A and 2B may also be performed on a device other than the service provider device 104, and in these cases, the second location estimate may be provided 208 to a process for a different purpose. For example, if the method is performed on a service requestor device 102 after a service requestor has requested a trip, the service requestor device 102 may provide 208 the second location estimate to the service provider device 104 so that the service provider device 104 can meet the service requestor at his or her current location.

If the second location estimate does not satisfy the accuracy condition, then the second location estimate is not a sufficiently accurate representation of the current location of the service requestor device 104, and the service requestor device 104 may withhold 210 the second location estimate from the process. The service requestor device 104 may additionally or alternatively provide 212 the third location estimate as input to the process because the third location estimate may represent a more accurate representation of the current location of the service requestor device 104.

Figure 3B:
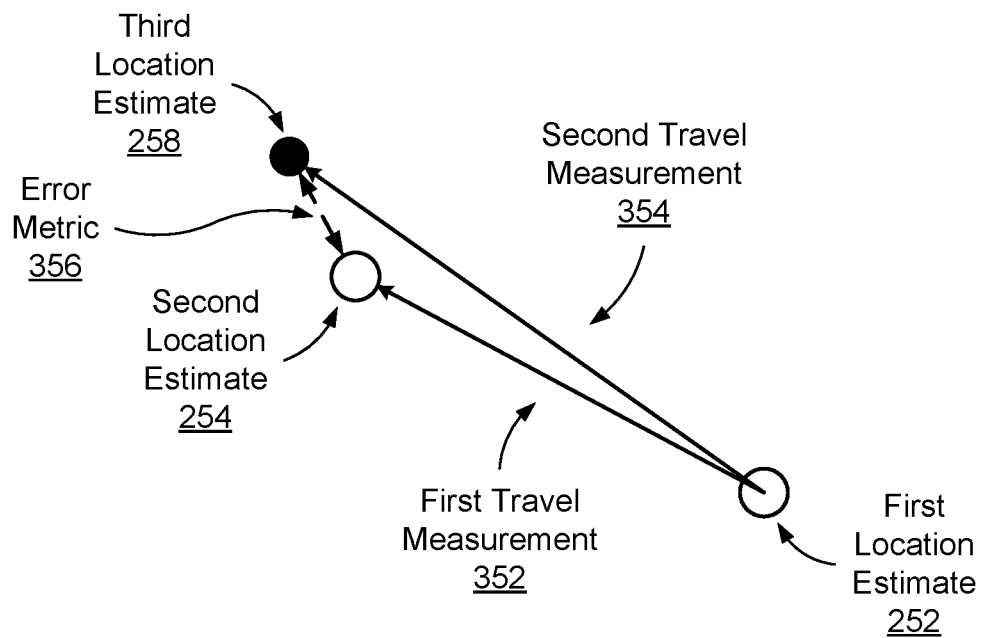
FIG. 3B illustrates an example of travel measurements, according to one embodiment.

FIG. 3A is a flow chart illustrating a method for determining the accuracy of a location reported by a satellite navigation sensor based on data from a second sensor, according to one embodiment. FIG. 3B illustrates an example of the travel measurements and error metric that are generated as part of this process, according to one embodiment. For ease of description, the method shown in FIG. 3A will be discussed below in conjunction with the example shown in FIG. 3B.

The service provider device 104 generates 302 a first travel measurement. The first travel measurement quantifies the difference between the first location estimate and the second location estimate. Because the first and second location estimates are both determined based on data from the satellite navigation sensor 108B, the first travel measurement represents the distance traveled between the first and second times, as measured by the satellite navigation sensor.

In one embodiment, the first travel measurement is a vector quantity that specifies a heading and a distance for a vector with a tail at the first location estimate and a head at the second location estimate. In this embodiment, the first travel measurement may be generated, for example, by computing a difference in the x-components of the first and second location estimates, computing a difference in the y-components of the first and second location estimates, and assembling the two differences as a two-dimensional vector. In another embodiment, the first travel measurement is a scalar quantity that specifies a distance (but not a heading) between the first location estimate and the second location estimate. In this embodiment, the first travel measurement may be generated, for example by computing a vector between the first and second location estimates and then computing the magnitude of the vector.

The service provider device 104 also generates 304 a second travel measurement. The second travel measurement quantifies the difference between the first location estimate and the third location estimate. Because the third location estimate is determined based on data from the second sensor, the second travel measurement represents the distance traveled between the first and second times, as measured by the second sensor. Similar to the first travel measurement, the second travel measurement may also be a vector quantity (e.g., a heading and a distance that vector whose tail is at the first location estimate and whose head is at the third location estimate) or a scalar quantity (e.g., a distance between the first location estimate and the third location estimate).

FIG. 3B illustrates an example of the first and second travel measurements 352, 354 for the first, second, and third location estimates 252, 254, 258 shown in FIG. 2B. In the example shown in FIG. 3B, both the first and second travel measurements 352, 354 are vector quantities. Thus, the first travel measurement 352 is a vector with a tail at the first location estimate 252 and a head at the second location estimate 254, while the second travel measurement 354 is a vector with a tail at the first location estimate 252 and a head at the third location estimate 258.

Referring back to FIG. 3A, the service provider device 104 computes 306 one or more error metrics based on the first and second travel measurements. An error metric quantifies the difference between the first and second travel measurements. For example, an error metric has a smaller value when the first and second travel measurements have similar values, and the error metric has a larger value when there is a large disparity between the first and second travel measurements. Because the first and second travel measurements represent separate estimates of the distance that the service provider device 104 has traveled between the first and second times, a relatively small error metric indicates that the satellite navigation sensor 108B and the second sensor 110 B are providing similar data, which in turn indicates that the satellite navigation sensor 108B is providing relatively accurate data.

In embodiments where the travel measurements are scalar quantities, an error metric may be computed in one or more of the following ways:

(1) computing a difference between the first travel measurement and the second travel measurement:

$$m_e = |d_1 - d_2|;$$

(2) computing a normalized difference between the first travel measurement and the second travel measurement (e.g., computing a difference between the two travel measurements, computing a sum of the two travel measurements, and computing a ratio between the difference and the sum):

$$m_e = \frac{|d_1 - d_2|}{|d_1 + d_2|};$$

(3) computing a ratio between the first travel measurement and the second travel measurement:

$$m_e = \frac{d_2}{d_1}; \text{ or } m_e = \frac{d_1}{d_2};$$

In the equations for the example error metrics provided above, $d_1$ and $d_2$ represent the first and second travel measurements, respectively, and $m_e$ represents the error metric.

In embodiments where the travel measurements are vector quantities, the error metric may be computed in one or more of the following ways:

(1) computing a difference in headings between the first travel measurement and the second travel measurement;

(2) performing vector subtraction on the first travel measurement and the second travel measurement to generate a difference vector that points from the second location estimate to the third location estimate (or from the third location estimate to the second location estimate):

$$\vec{m}_e = \vec{d}_1 - \vec{d}_2; \text{ or } \vec{m}_e = \vec{d}_2 - \vec{d}_1;$$

(3) generating a difference vector based on the method described above and computing the length of the distance vector (which represents the distance between the second and third location estimates):

$$m_e = |\vec{d}_1 - \vec{d}_2|.$$

In the equations for the example error metrics provided above, $\vec{d}_1$ and $\vec{d}_2$ represent the first and second travel measurements, respectively, and $m_e$ (or $\vec{m}_e$) represents the error metric.

The service provider device 104 determines 308 whether the second location estimate satisfies an accuracy condition. In some embodiments, the service provider device 104 computes 306 a single error metric and determines 308 whether the second location estimate satisfies the accuracy condition by comparing the error metric to an error threshold. If the error metric is less than the error threshold, then the accuracy condition is satisfied; meanwhile, if the error metric is greater than the error threshold, then the accuracy condition is not satisfied.

In the example shown in FIG. 3B, the service provider device 104 computes 306 a single error metric 356 representing the length of the difference vector between the first and second travel measurements 352, 354 (e.g., the distance between the second and third location estimates 254, 258), and the service provider device 104 compares the error metric 356 to an error threshold to determine whether the second location estimate 254 satisfies the accuracy condition.

In other embodiments, the service provider device 104 computes 306 multiple error metrics and determines 308 whether the second location estimate satisfies the accuracy condition by comparing each error metric with an associated error threshold and performing one or more AND and/or OR operations. For example, the service provider device 104 computes 306 two error metrics, compares the first error metric to a first error threshold associated with the first error metric, and compares the second error metric to a second error threshold associated with the second error metric. In this example, the service provider device 104 may determine 308 that the accuracy condition is met if the both error metrics are below their associated error thresholds (e.g., the first error metric AND the second error metric are both below their associated error thresholds) or if at least one of the error metrics is below its associated error threshold (e.g., the first error metric OR the second error metric is below its associated error threshold).

In some embodiments, the determination 308 of whether the second location estimate satisfies an accuracy condition can also be based at least in part on a comparison of the second location estimate to map data. For example, the error metrics computed 306 by the service provider device 104 may include a map-based error metric representing the distance between the second location estimate and the nearest road (as indicated by map data for the geographic area surrounding the second location estimate). Thus, if the service provider device 104 is known to be in a transportation vehicle, but the second location estimate indicates that the service provider device 104 is at a position noted on a map as being in a building (rather than a road), then the map-based error metric has a relatively high value. Similar to the other error metrics described above, the service provider device 104 compares the map-based error metric to an associated error threshold, and the map-based error metric can be combined with other error metrics using AND and/or OR operators when determining 308 whether the second location estimate satisfies the accuracy condition.

In some embodiments, the error thresholds associated with one or more of the error metrics are generated with a machine learning process. The machine learning process collects training data by collecting data from the satellite navigation sensor 108B and the second sensor 110B along a series of locations that are known with a high degree of accuracy (e.g., a higher degree of accuracy than can be provided by the satellite navigation sensor 108B). The series of locations known with a high degree of accuracy is referred to herein as ground truth information.

The training data may be collected, for example, by having an operator drive a vehicle with a satellite navigation sensor (e.g., a mobile device with a GPS receiver), a second sensor (e.g., a mobile device with an IMU), and a high-precision location sensor whose accuracy is higher than the satellite navigation sensor. The data from the high-precision location sensor is used as ground truth information. The training data may additionally or alternatively be collected, for example, by having an operator drive a vehicle along a predetermined route with both a satellite navigation sensor (e.g., a mobile device with a GPS receiver) and a second sensor (e.g., a mobile device with an IMU) inside the vehicle. In this example, the predetermined route is used as ground truth information. In both of these training data collection methods, the satellite navigation sensor and the second sensor collect data in the same manner as describe in the method shown in FIG. 2A, and the data is used to generate one or more error metric values using the method shown in FIG. 3A.

Together, the data from the satellite navigation sensor, the data from the second sensor, the error metric values, and the ground truth information constitute training data. The training data is provided as input to a classifier, and the classifier performs analysis on the training data with machine learning principles to determine threshold error value(s) associated with each error metric and (if more than one error metric is used) to determine a combination of error metrics (e.g., combined with AND and/or OR operators) and associated threshold error value(s) that yields desirable results. This combination of error metrics and associated threshold error values(s) is then provided to the method shown in FIG. 3A to be used to determine 308 whether the second location estimate satisfies the accuracy condition.

Figure 4:
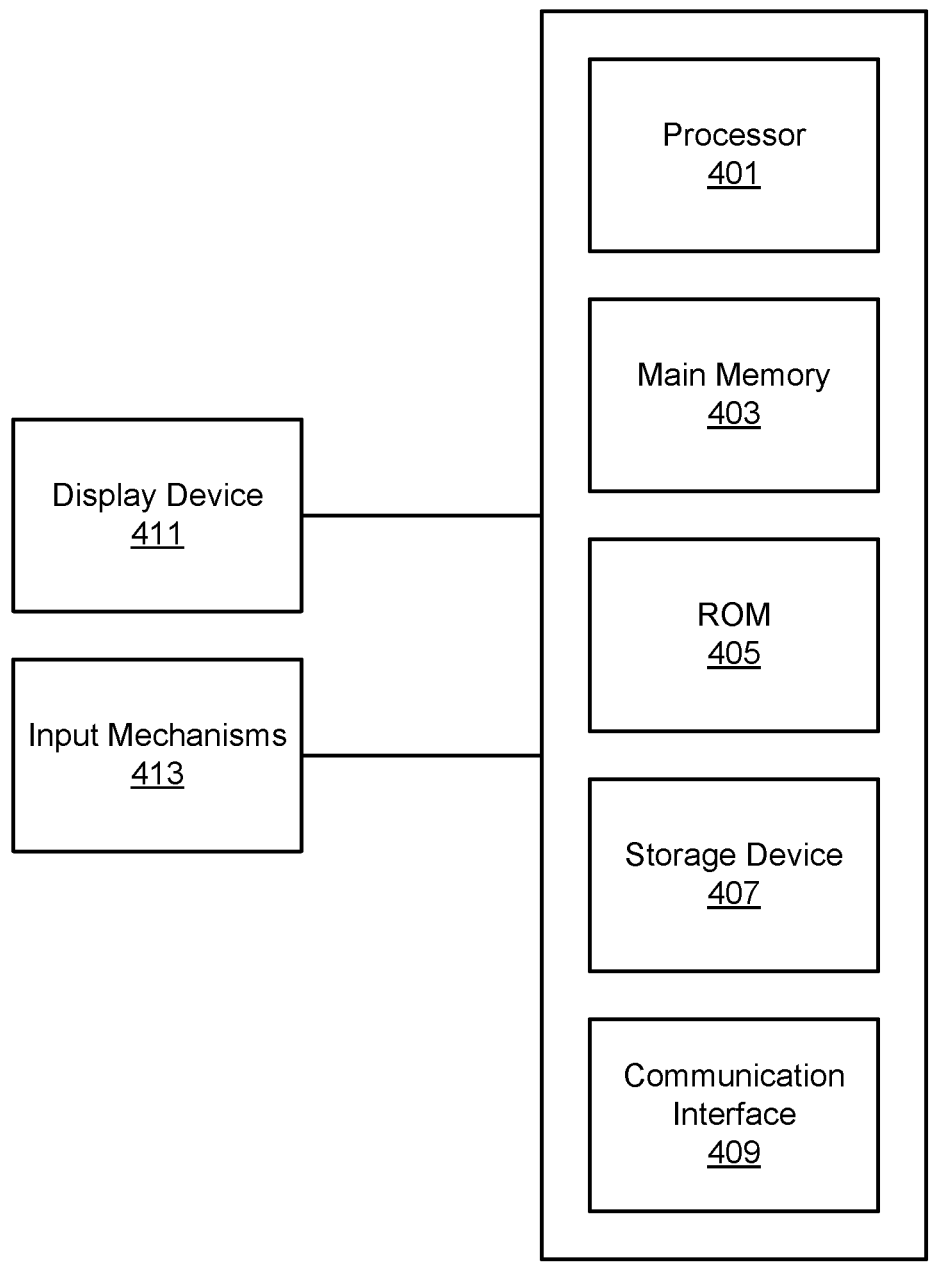
FIG. 4 illustrates a computer system that implements the embodiments herein, according to one embodiment.

FIG. 4 is a diagram illustrating a computer system upon which embodiments described herein may be implemented. For example, in the context of FIG. 1, the service coordination system 100 may be implemented using a computer system such as described by FIG. 4. The service coordination system 100 may also be implemented using a combination of multiple computer systems as described by FIG. 4.

In one implementation, the service coordination system 100 includes processing resources 401, main memory 403, read only memory (ROM) 405, storage device 407, and a communication interface 409. The service coordination system 100 includes at least one processor 401 for processing information and a main memory 403, such as a random access memory (RAM) or other dynamic storage device, for storing information and instructions to be executed by the processor 401. Main memory 403 also may be used for storing temporary variables or other intermediate information during execution of instructions to be executed by processor 401. The service coordination system 100 may also include ROM 405 or other static storage device for storing static information and instructions for processor 401. The storage device 407, such as a magnetic disk or optical disk, is provided for storing information and instructions.

The communication interface 409 can enable the service coordination system 100 to communicate with one or more networks (e.g., cellular network) through use of the network link (wireless or wireline). Using the network link, the service coordination system 100 can communicate with one or more computing devices, and one or more servers. In some variations, the service coordination system 100 can be configured to receive sensor data (e.g., such as GPS data) from one or more location tracking devices via the network link. The sensor data can be processed by the processor 401 and can be stored in, for example, the storage device 407. The processor 401 can process the sensor data of a location tracking device in order to determine the path of travel of a transportation vehicle corresponding to the location tracking device. Extrapolated position information can be transmitted to one or more service requestor devices over the network 106 to enable the service applications 112 running on the service requestor devices to use the position information to present a visualization of the actual movement of the transportation vehicles.

The map server 100 can also include a display device 411, such as a cathode ray tube (CRT), an LCD monitor, or a television set, for example, for displaying graphics and information to a user. An input mechanism 413, such as a keyboard that includes alphanumeric keys and other keys, can be coupled to the map server 100 for communicating information and command selections to processor 401. Other non-limiting, illustrative examples of input mechanisms 413 include a mouse, a trackball, touch-sensitive screen, or cursor direction keys for communicating direction information and command selections to processor 401 and for controlling cursor movement on display device 411.

Examples described herein are related to the use of the map server 100 for implementing the techniques described herein. According to one embodiment, those techniques are performed by the map server 100 in response to processor 401 executing one or more sequences of one or more instructions contained in main memory 403. Such instructions may be read into main memory 403 from another machine-readable medium, such as storage device 407. Execution of the sequences of instructions contained in main memory 403 causes processor 401 to perform the process steps described herein. In alternative implementations, hard-wired circuitry may be used in place of or in combination with software instructions to implement examples described herein. Thus, the examples described are not limited to any specific combination of hardware circuitry and software.

Figure 5:
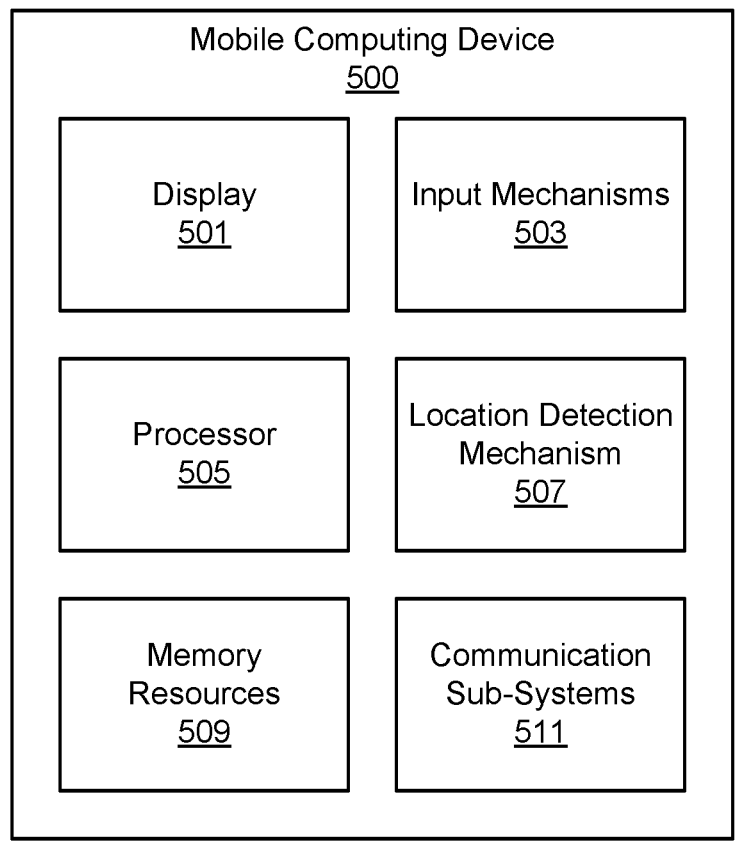
FIG. 5 illustrates a mobile computing device that implements the embodiments herein, according to one embodiment.

FIG. 5 is a diagram illustrating a mobile computing device 500 upon which embodiments described herein may be implemented. In one embodiment, a computing device 500 may correspond to a mobile computing device, such as a cellular device that is capable of telephony, messaging, and data services. The computing device 500 can correspond to each of the location tracking device 101 and the service requestor device 103. Examples of such devices include smartphones, handsets or tablet devices for cellular carriers. Computing device 500 includes a processor 505, memory resources 509, a display device 501 (e.g., such as a touch-sensitive display device), one or more communication sub-systems 511 (including wireless communication sub-systems), input mechanisms 503 (e.g., an input mechanism can include or be part of the touch-sensitive display device), and one or more location detection mechanisms (e.g., GPS module) 507. In one example, at least one of the communication sub-systems 511 sends and receives cellular data over data channels and voice channels.

The processor 505 is configured with software and/or other logic to perform one or more processes, steps and other functions described with implementations, such as those described herein. Processor 505 is configured, with instructions and data stored in the memory resources 509, to operate a service application as described herein. For example, instructions for operating the service application in order to display user interfaces can be stored in the memory resources 509 of the computing device 500.

Reference in the specification to "one embodiment" or to "an embodiment" means that a particular feature, structure, or characteristic is included in at least one embodiment of the disclosure. The appearances of the phrase "in one embodiment" or "a preferred embodiment" in various places in the specification are not necessarily referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects disclosed herein include process steps and instructions described herein in the form of a method. It should be noted that the process steps and instructions described herein can be embodied in software, firmware or hardware, and when embodied in software, can be downloaded to reside on and be operated from different platforms used by a variety of operating systems.

The embodiments discussed above also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the embodiments are not described with reference to any particular programming language. It will be appreciated that a variety of programming languages may be used to implement the teachings described herein, and any references below to specific languages are provided for disclosure of enablement and best mode.

While the disclosure has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure is intended to be illustrative, but not limiting, of the scope of the invention.

What is claimed is:

1. A method comprising:
   determining, using a satellite navigation sensor at a location detection device, a first location estimate at a first time and a second location estimate at a second time;
   determining motion data collected by an inertial measurement unit, the motion data indicative of motion of the location detection device for at least a portion of time between the first time and the second time;
   determining, based on the motion data, a third location estimate at the second time;
   determining, using one or more processors, whether the second location estimate satisfies an accuracy condition based at least on the first location estimate, the second location estimate, and the third location estimate, comprising:
      generating a first travel measurement based on a difference between the first location estimate and the second location estimate;
      generating a second travel measurement based on a difference between the first location estimate and the third location estimate;
      computing an error metric based on a comparison of the first travel measurement and the second travel measurement; and
      determining whether the second location estimate satisfies the accuracy condition based on a comparison of the error metric to an error threshold value; and responsive to determining that the second location estimate satisfies the accuracy condition, providing the second location estimate as input to a location-based process.

2. The method of claim 1, wherein the third location estimate is determined by performing a dead reckoning process on the motion data.

3. The method of claim 1, further comprising:
responsive to a determination that the second location estimate does not satisfy the accuracy condition, withholding the second location estimate from the process.

4. The method of claim 1, further comprising:
responsive to a determination that the second location estimate does not satisfy the accuracy condition, providing the third location estimate as input to the process.

5. The method of claim 1, wherein the first travel measurement is a scalar quantity representing a distance between the first location estimate and the second location estimate, wherein the second travel measurement is a scalar quantity representing a distance between the first location estimate and the third location estimate, and wherein computing the error metric comprises computing a difference between the first travel measurement and the second travel measurement.

6. The method of claim 1, wherein the first travel measurement is a scalar quantity representing a distance between the first location estimate and the second location estimate, wherein the second travel measurement is a scalar quantity representing a distance between the first location estimate and the third location estimate, and wherein computing the error metric comprises computing a ratio between the first travel measurement and the second travel measurement.

7. The method of claim 1, wherein the first travel measurement is a vector quantity representing a distance and a heading between the first location estimate and the second location estimate, wherein the second travel measurement is a vector quantity representing a distance and a heading between the first location estimate and the third location estimate, and wherein computing the error metric comprises performing vector subtraction on the first travel measurement and the second travel measurement to generate a difference vector between the first travel measurement and the second travel measurement.

8. The method of claim 1, wherein the first travel measurement is a vector quantity representing a distance and a heading between the first location estimate and the second location estimate, wherein the second travel measurement is a vector quantity representing a distance and a heading between the first location estimate and the third location estimate, and wherein computing the error metric comprises computing a difference between the heading of the first travel measurement and the heading of the second travel measurement.

9. A non-transitory computer-readable medium storing computer program instructions executable by a processor to perform operations, the operations comprising:
determining, using a satellite navigation sensor at a location detection device, a first location estimate at a first time and a second location estimate at a second time;
determining motion data collected by an inertial measurement unit, the motion data indicative of motion of the location detection device for at least a portion of time between the first time and the second time;
determining, based on the motion data, a third location estimate at the second time;
determining, using one or more processors, whether the second location estimate satisfies an accuracy condition based at least on the first location estimate, the second location estimate, and the third location estimate, comprising:
generating a first travel measurement based on a difference between the first location estimate and the second location estimate;
generating a second travel measurement based on a difference between the first location estimate and the third location estimate;
computing an error metric based on a comparison of the first travel measurement and the second travel measurement; and
determining whether the second location estimate satisfies the accuracy condition based on a comparison of the error metric to an error threshold value; and
responsive to determining that the second location estimate satisfies the accuracy condition, providing the second location estimate as input to a location-based process.

10. The non-transitory computer-readable medium of claim 9, wherein the third location estimate is determined by performing a dead reckoning process on the motion data.

11. The non-transitory computer-readable medium of claim 9, the operations further comprising:
responsive to a determination that the second location estimate does not satisfy the accuracy condition, withholding the second location estimate from the process.

12. The non-transitory computer-readable medium of claim 9, the operations further comprising:
responsive to a determination that the second location estimate does not satisfy the accuracy condition, providing the third location estimate as input to the process.

13. The non-transitory computer-readable medium of claim 9, wherein the first travel measurement is a scalar quantity representing a distance between the first location estimate and the second location estimate, wherein the second travel measurement is a scalar quantity representing a distance between the first location estimate and the third location estimate, and wherein computing the error metric comprises computing a difference between the first travel measurement and the second travel measurement.

14. The non-transitory computer-readable medium of claim 9, wherein the first travel measurement is a scalar quantity representing a distance between the first location estimate and the second location estimate, wherein the second travel measurement is a scalar quantity representing a distance between the first location estimate and the third location estimate, and wherein computing the error metric comprises computing a ratio between the first travel measurement and the second travel measurement.

15. The non-transitory computer-readable medium of claim 9, wherein the first travel measurement is a vector quantity representing a distance and a heading between the first location estimate and the second location estimate, wherein the second travel measurement is a vector quantity representing a distance and a heading between the first location estimate and the third location estimate, and wherein computing the error metric comprises performing vector subtraction on the first travel measurement and the second travel measurement to generate a difference vector between the first travel measurement and the second travel measurement.

16. The non-transitory computer-readable medium of claim 9, wherein the first travel measurement is a vector quantity representing a distance and a heading between the first location estimate and the second location estimate, wherein the second travel measurement is a vector quantity representing a distance and a heading between the first location estimate and the third location estimate, and wherein computing the error metric comprises computing a difference between the heading of the first travel measurement and the heading of the second travel measurement.

17. A system, comprising:
a processor; and
a non-transitory computer-readable medium storing computer program instructions executable by the processor to perform operations, the operations comprising:
  determining, using a satellite navigation sensor at a location detection device, a first location estimate at a first time and a second location estimate at a second time;
  determining motion data collected by an inertial measurement unit, the motion data indicative of motion of the location detection device for at least a portion of time between the first time and the second time;
  determining, based on the motion data, a third location estimate at the second time;
  determining, using one or more processors, whether the second location estimate satisfies an accuracy condition based at least on the first location estimate, the second location estimate, and the third location estimate, comprising:
    generating a first travel measurement based on a difference between the first location estimate and the second location estimate;
    generating a second travel measurement based on a difference between the first location estimate and the third location estimate;
    computing an error metric based on a comparison of the first travel measurement and the second travel measurement; and
    determining whether the second location estimate satisfies the accuracy condition based on a comparison of the error metric to an error threshold value; and
  responsive to determining that the second location estimate satisfies the accuracy condition, providing the second location estimate as input to a location-based process.

18. The system of claim 17, wherein the third location estimate is determined by performing a dead reckoning process on the motion data.

19. The system of claim 17, wherein the first travel measurement is a scalar quantity representing a distance between the first location estimate and the second location estimate, wherein the second travel measurement is a scalar quantity representing a distance between the first location estimate and the third location estimate, and wherein computing the error metric comprises computing a difference between the first travel measurement and the second travel measurement.

20. The system of claim 17, wherein the first travel measurement is a vector quantity representing a distance and a heading between the first location estimate and the second location estimate, wherein the second travel measurement is a vector quantity representing a distance and a heading between the first location estimate and the third location estimate, and wherein computing the error metric comprises performing vector subtraction on the first travel measurement and the second travel measurement to generate a difference vector between the first travel measurement and the second travel measurement.

* * * * *